(12) United States Patent
Dulac et al.

(10) Patent No.: US 7,295,930 B2
(45) Date of Patent: Nov. 13, 2007

(54) METHOD, DEVICE AND SOFTWARE PACKAGE FOR SMOOTHING A SUBSURFACE PROPERTY

(75) Inventors: Jean-Claude Dulac, Sugarland, TX (US); Fabien Bosquet, Nancy (FR); Emmanuel Labrunye, Nancy (FR)

(73) Assignee: Earth Decision Sciences, Vandoeu-Vre-les-Nancy (FR)

( * ) Notice: Subject to any disclaimer, the term of this patent is extended or adjusted under 35 U.S.C. 154(b) by 271 days.

(21) Appl. No.: 10/518,485

(22) PCT Filed: Jun. 11, 2003

(86) PCT No.: PCT/FR03/01755

§ 371 (c)(1),
(2), (4) Date: Dec. 20, 2004

(87) PCT Pub. No.: WO04/001451

PCT Pub. Date: Dec. 31, 2003

(65) Prior Publication Data

US 2005/0222774 A1 Oct. 6, 2005

(30) Foreign Application Priority Data

Jun. 19, 2002 (FR) .................................. 02/07597

(51) Int. Cl.
*G01V 1/30* (2006.01)

(52) U.S. Cl. ............................. 702/17; 367/72; 367/73; 364/421; 702/14

(58) Field of Classification Search ................... 702/14, 702/16; 367/72–73
See application file for complete search history.

(56) References Cited

U.S. PATENT DOCUMENTS

| 4,672,546 A | 6/1987 | Flinchbaugh |
| 5,615,171 A * | 3/1997 | Hildebrand .................. 367/72 |
| 5,930,730 A | 7/1999 | Kirlin et al. |
| 6,138,076 A | 10/2000 | Graf et al. |
| 6,151,555 A | 11/2000 | Pepper |
| 2002/0022930 A1 | 2/2002 | Dalley et al. |

* cited by examiner

*Primary Examiner*—John Barlow
*Assistant Examiner*—Sujoy Kundu
(74) *Attorney, Agent, or Firm*—Young & Thompson

(57) ABSTRACT

The invention concerns a method for smoothing a subsurface property in a geological structure represented by seismic measurements comprising a step (100) which consists in digital modelling by continuous local seismic traces, calculating an optimal offset and defining a conditional neighbourhood of a reference central continuous local seismic trace; a step (101) which consists in selecting the property to be smoothed on a conditional neighbourhood; a third step (102) which consists in substituting properties of the conditional neighbourhood with offset properties; and a fourth step (103) which consists in selecting an average of the properties offset on the conditional neighbourhood at step (102).

18 Claims, 3 Drawing Sheets

METHOD, DEVICE AND SOFTWARE PACKAGE FOR SMOOTHING A SUBSURFACE PROPERTY

The invention relates to a process for smoothing a subsurface property in a geological structure represented by seismic measurements.

The invention also relates to a device for smoothing a subsurface property in a geological structure represented by seismic measurements.

Finally, the invention relates to a computer software package permitting the operation of a programmable device for smoothing a subsurface property in a geological structure represented by seismic measurements.

The document WO 01/63323 A1 discloses a process for processing seismic data comprising the steps consisting in: obtaining a volume of seismic data covering a predetermined volume of ground; determining for each voxel of the volume of seismic data the local orientation of the seismic data; determining for each voxel if there exists an edge in the neighborhood, and executing a smoothing operation on each voxel in the volume of seismic data, in which the direction of the smoothing operation is the local orientation of the data, and in which the operation of smoothing does not exceed the edge, so as to obtain a volume of processed seismic data, in which the quantities associated with each voxel in the volume of processed data is the result obtained by the execution of the operation of smoothing in the voxel in the volume of seismic data.

The document WO 02/13139 A1 discloses a process for processing seismic images comprising the steps: of obtaining a set of data of an initial bi-dimensional or tri-dimensional image, in which element of the set of data is the initial image intensity of the point of the image; computing for each point the partial derivatives of the element in the n direction to obtain a set of values derived from the partial derivatives; computing for each point a symmetrical structural square matrix from the values of the partial derivatives; carrying out a point by point iteration weighted by a variable near zero when the point is near an edge and near 1 when it is very far from an edge; and repeating these steps a number of times to obtain the processed image.

A first object of the invention is to improve the smoothing of the subsurface properties in a geological structure represented by seismic measurements.

A second object of the invention is to permit a simple and rapid smoothing of the subsurface properties, whilst not smoothing the discontinuities.

The invention has for its object a process for smoothing a subsurface property in a geological structure represented by seismic measurements, in which there is constructed a continuous function $S_{i,j,k}(t)$ by interpolation or approximation of the discrete seismic traces of a multi-dimensional seismic matrix, said function being designated by "continuous local seismic trace", comprising the following steps:

a). using as optimum offset $h_{ij,pq,k}$ of two adjacent continuous local seismic traces $S_{ij,k}(t)$ and $S_{pq,k}(t)$, the offset value rendering maximum their correlation function;

b) taking as the conditional neighborhood of a central continuous local seismic trace $S_{ij,k}(t)$ the sub-neighborhood consisting in adjacent traces $S_{pq,k}(t)$ corresponding to optimum offsets $h_{ij,pq,k}$ associated with correlations $R_{ij,pq,k}(h_{ij,pq,k})$ greater than a predetermined threshold comprised between 0 and 1;

c). choosing a subsurface property to be smoothed in the conditional neighborhood of a point (i, j, k) of a reference "central" continuous local seismic trace;

d). offsetting the subsurface properties of the conditional neighborhood by translating a current variable of the value of optimal offset $h_{ij,pq,k}$;

e). taking as the smooth value at the point (i, j, k) an average of the offset subsurface properties from step d).

According to other characteristics of the invention:
the average of the surface properties of step e) is an average which can be weighted, for example by the maximum correlation value corresponding to the optimum offset,
the average of the subsurface properties of step e) is selected from the following set: arithmetic average, geometric average, harmonic average,
there is chosen as the subsurface property to be smoothed the amplitude reflected and detected by geophones,
if necessary, the set of smoothing processes is repeated a certain number of times to include the smoothing,
the multi-dimensional matrix cross-sections of smooth properties are visualized on a visualization screen.

The invention also has for its object a device for practicing the process according to the invention, comprising means to use as optimum offset of two adjacent continuous local seismic traces the offset value rendering maximal their correlation function, means to offset the subsurface properties of the conditional neighborhood by translating the current variable of the value of the optimum offset $h_{ij,pq,k}$, means to select a subsurface property to be smoothed at the conditional neighborhood of a point (i, j, k) of a reference "central" continuous local seismic trace, means to offset the subsurface properties of the conditional neighborhood by translating the current variable of the value of the optimum offset $h_{ij,pq,k}$, and means to take as the smoothed value at the point (i, j, k) an average of the subsurface properties offset in step d).

According to other characteristics of the invention:
the device comprises memorization means and means for visualizing seismic parameters determined with the help of the process according to the invention.

Finally, the invention has for its object a computer software package, comprising program code elements to execute the steps of a process according to the invention, when said program is executed by a computer.

The invention will be better understood from the description which follows, given by way of non-limiting example, with reference to the accompanying drawings, in which.

With reference to FIGS. 1 to 5, identical or functionally equivalent elements are designated by the same references.

Figure 1:
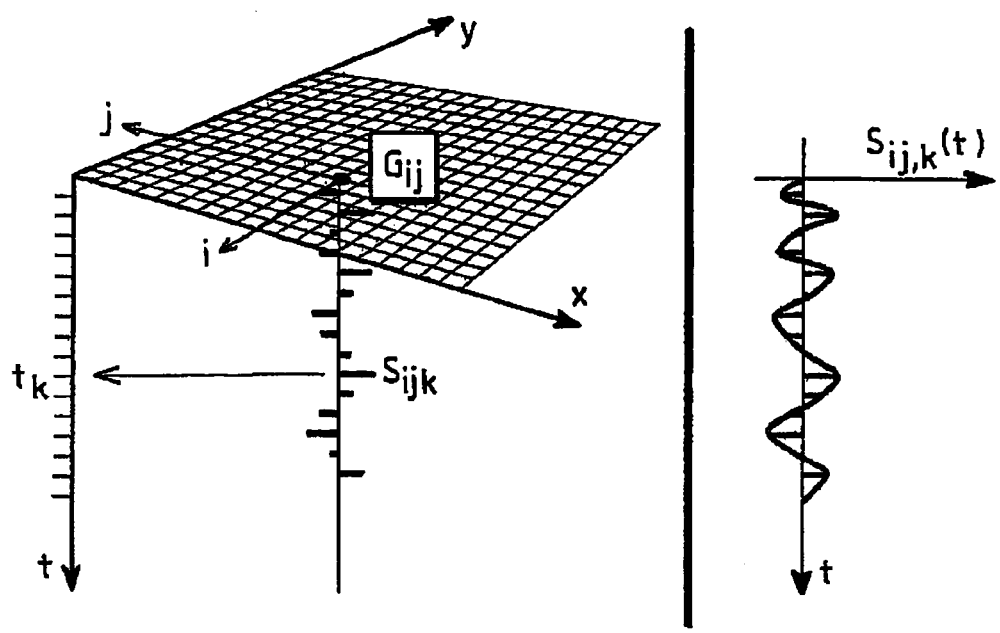
FIG. 1 represents schematically a three-dimensional seismic matrix and a continuous local seismic trace.

In FIG. 1, a three-dimensional seismic matrix is obtained by taking measurements recorded by geophones $G_{ij}$ disposed on a network x,y at coordinate points i, j. The taking of these sampled measurements according to time is represented on a descending axis t representative of the depth or of the vertical descent from the surface of the ground or the sea. The measurements are characterized by their amplitude, for example an amplitude taken by the geophone $G_{ij}$ at the time or at the depth of sampling $t_k$. The discrete measurement carried out by the geophone $G_{ij}$ in time or at depth $t_k$ is called the seismic amplitude $S_{ij,k}$.

The set of seismic amplitudes corresponding to a geophone $G_{ij}$ of coordinates i, j is a uni-dimensional matrix ($S_{ij1}$, $S_{ij2}$, ..., $S_{ijk}$, ..., $S_{ijN}$) called a discrete seismic trace, because this uni-directional matrix corresponds to the trace according to the point of horizontal coordinates i, j of the three-dimensional seismic matrix obtained by seismic measurements.

The vertical axis t oriented along a descending vertical line usually designates time, but can also be considered to represent a depth from the surface.

The invention also relates to the application of a third coordinate t representative of time, as well as a third coordinate t representative of depth.

From the discrete seismic trace located on the vertical of a geophone $G_{ij}$ there is defined by interpolation or approximation discrete values about $t=t_k=k$, a continuous function $S_{ij,k}(t)$ which is designated as "continuous local seismic trace". The methods of approximation or interpolation of discrete values to give rise to a continuous function are numerous, and comprise particularly polynomial interpolations or approximations, as well as polynomial trigonometric interpolations or approximations.

Any other variant of interpolation or approximation within a continuous function can also be used in the present invention to provide a "continuous local seismic trace".

Figure 2:
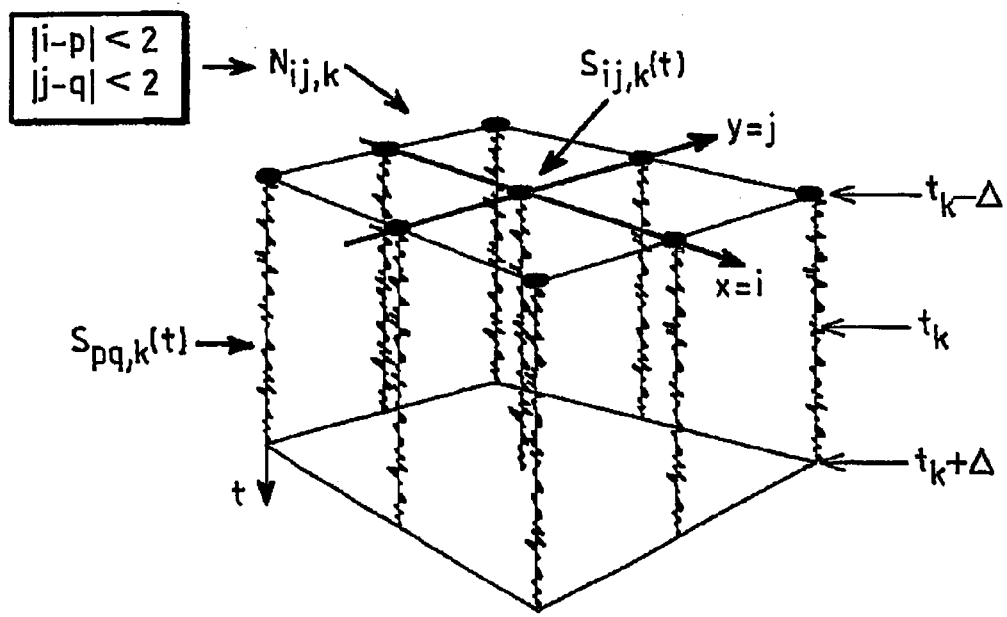
FIG. 2 represents schematically an example of local neighborhood $N_{ij,k}$ consisting of a set of continuous local seismic traces $S_{pq,k}(t)$ adjacent the central reference trace $S_{ij,k}(t)$ itself located on the vertical of the geophone $G_{ij}$ and interpolating the seismic amplitudes about t=k.

In FIG. 2, several continuous local seismic traces define an example of neighborhood of a reference "central" continuous local seismic trace $S_{ij,k}(t)$. The neighborhood of a continuous local seismic trace $S_{ij,k}(t)$ is defined as the set of continuous local seismic traces whose horizontal spatial indices p,q are adjacent the horizontal spatial indices i, j of the reference continuous local seismic trace.

By way of example, the horizontal spatial coordinates p,q corresponding to the geophone $G_{pq}$ are adjacent the horizontal spatial coordinates i, j corresponding to the geophone $G_{ij}$ if the absolute values of the differences i−p and j−q are less than given whole numbers, for example 2.

In this case, as shown in FIG. 2, the continuous local seismic trace $S_{ij,k}(t)$ is associated with eight adjacent continuous local seismic traces surrounding the "central" continuous local seismic trace $S_{ij,k}(t)$.

In the case of continuous local seismic traces produced by seismic measurements, the profile of the geological horizons introduces vertical offsets between adjacent continuous local seismic traces. So as to determine the relationships between the two adjacent local continuous seismic traces $S_{ij,k}(t)$ and $S_{pq,k}(t)$ centered on the same sampling vertical coordinate $t=t_k=k$ and corresponding to different spatial coordinates i, j and p,q, there is calculated the correlation function $R_{ij,pq,k}(h)$ of the two continuous local seismic traces.

The correlation function of two adjacent continuous local seismic traces is obtained by the following formula $$R_{ij,pq,k}(h) = \frac{C_{ij,pq,k}(h)}{\sqrt{C_{ij,ij,k}(0) \cdot C_{pq,pq,k}(0)}}$$

in which the numerator corresponds to the covariance function of $S_{ij,k}(t)$ and $S_{pq,k}(t)$ obtained by the following expression $$C_{ij,pq,k}(h) = \int_{tk-\Delta}^{tk+\Delta} S_{ij,k}(t) \cdot S_{pq,k}(t+h) \cdot dt.$$

In this integral defining $C_{ij,pq,k}(h)$, the parameter $\Delta$ defines an "investigation vertical window" about $t=t_k=k$.

For example, if the continuous local seismic traces $S_{ij,k}(t)$ and $S_{pq,k}(t)$ are trigonometric polynomials of the following form interpolating the seismic-data $$S_{ij,k}(t) = \sum_{s=1}^{m} a_s^{ij,k} \cdot \cos(s\omega t) + b_s^{ij,k} \cdot \sin(s\omega t)$$

$$S_{ij,k}(t) = \sum_{s=1}^{m} a_s^{ij,k} \cdot \cos(s\omega t) + b_s^{ij,k} \cdot \sin(s\omega t)$$

then it can be shown that the covariance functions $C_{ij,pq,k}(h)$ is itself a trigonometric polynomial of the following form in which the coefficients $A_s^{ij,pq,k}$ and $B_s^{ij,pg,k}$ depend on the coefficients $a_s^{ij,k}$, $a_s^{pq,k}$, $b_{ij,k}$ and $b_s^{pq,k}$:

$$C_{ij,pq,k}(h) = \sum_{s=1}^{m} A_s^{ij,pq,k} \cdot \cos(s\omega h) + B_s^{ij,pq,k} \cdot \sin(s\omega h)$$

A conventional and known mathematical result is that the correlation function $$R_{ij,pq,k}(h) = \frac{C_{ij,pq,k}(h)}{\sqrt{C_{ij,ij,k}(0) \cdot C_{pq,pq,k}(0)}}$$

translates a similarity of correlated functions when this correlation function approaches 1.

The study of the correlation functions of the continuous local seismic traces $S_{ij,k}(t)$ and $S_{pq,k}(t)$ permits defining as optimum offset the value $h_{ij,pq,k}$ of h corresponding to the maximum of the correlation function $R_{ij,pq,k}(h)$, which is to say to the maximum of the correlation function nearest 1. Contrary to the existing art based on a discrete formulation of the correlation function $R_{ij,pq,k}(h)$, the use of a continuous formulation of the seismic traces and hence of the correlation function, permits obtaining an optimum offset which is not required to be a whole number multiple of the sampling interval along the vertical axis corresponding to the variable t.

Figure 3:
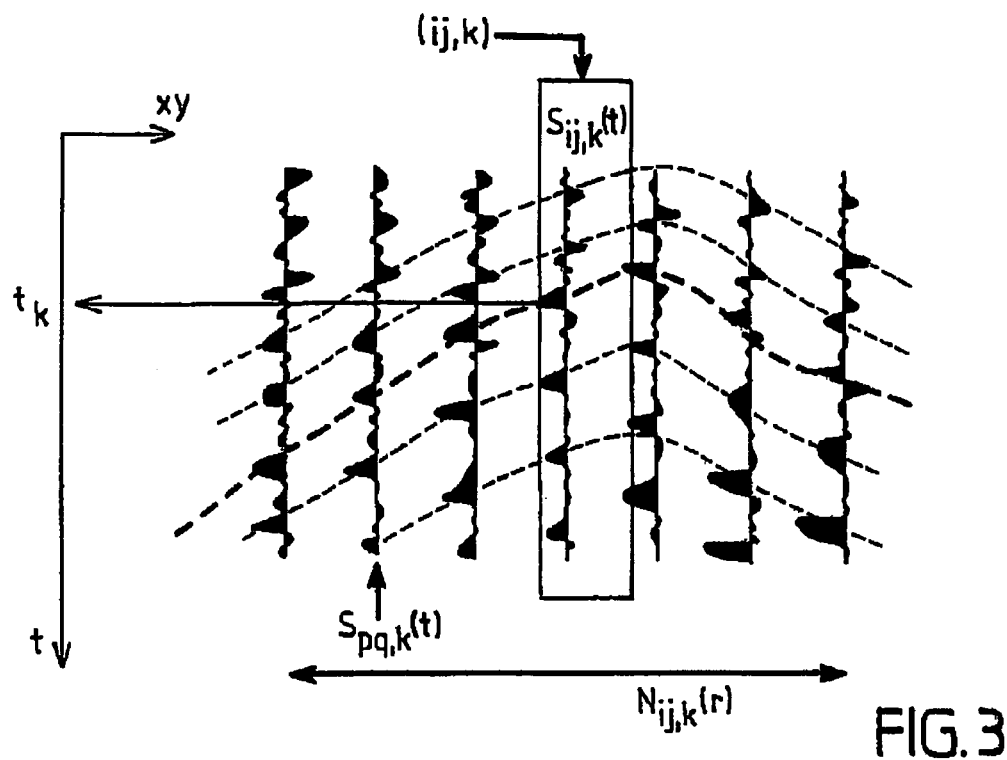
FIG. 3 represents schematically a vertical section of conditional local neighborhood $N_{ij,k}(r)$ of a reference continuous local seismic trace $S_{ij,k}(t)$
Figure 4:
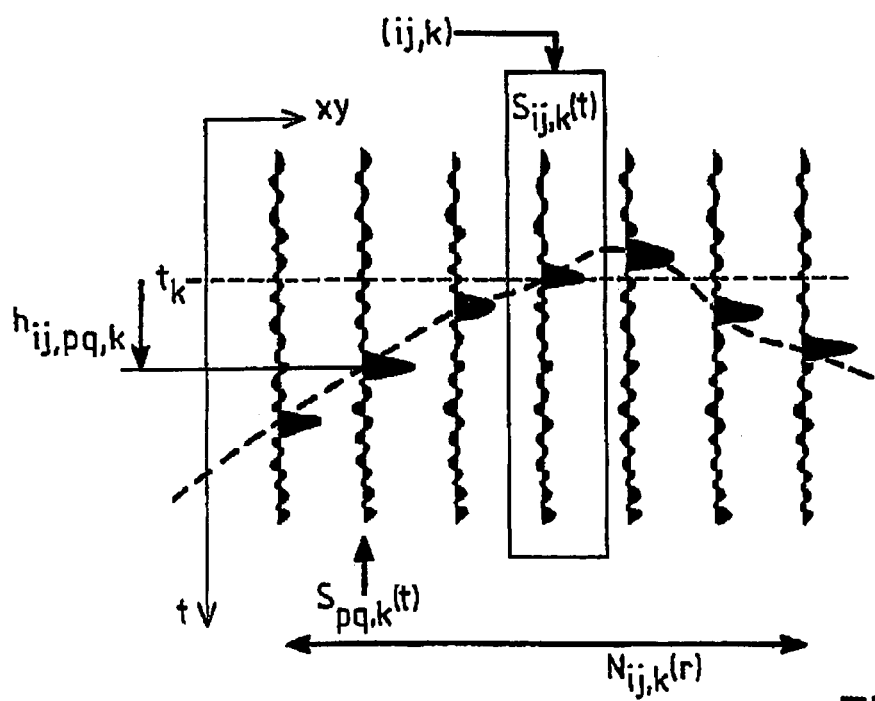
FIG. 4 represents schematically a vertical cross-section of a three-dimensional seismic matrix with an optimum offset $h_{ij,pq,k}$ and a conditional neighborhood $N_{ij,k}(r)$.
Figure 5:
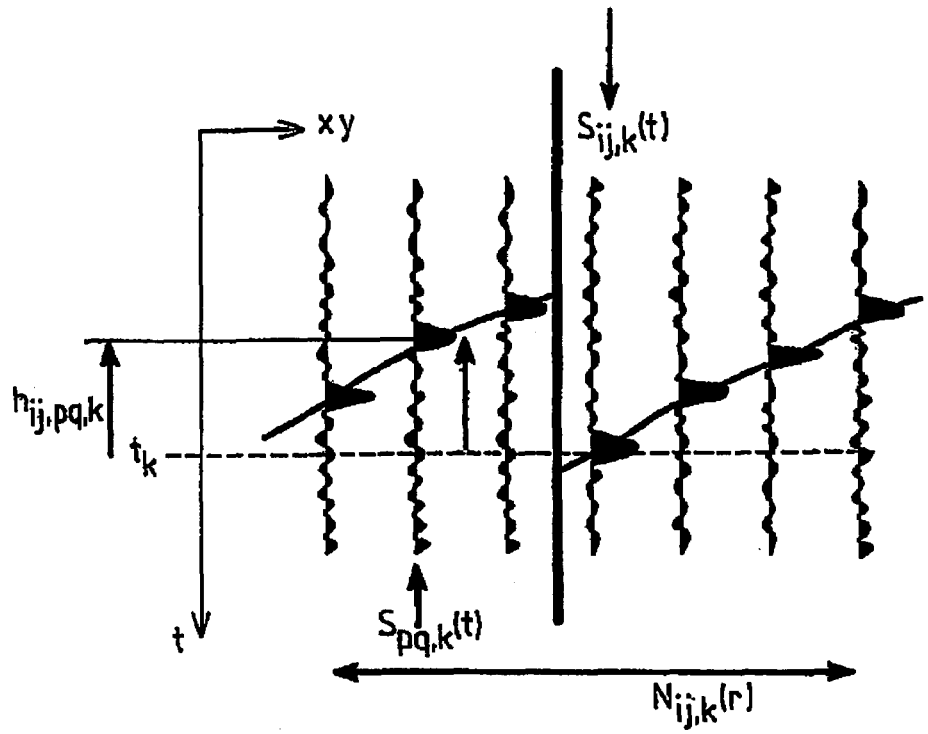
FIG. 5 represents schematically a vertical cross-section of a three-dimensional seismic matrix analogous to that of FIG. 4, with the presence of a fault or discontinuity.

The definition of the optimum offset $h_{ij,pq,k}$ of two adjacent continuous local seismic traces permits obtaining a first approximation of the horizons passing through this reference continuous local seismic trace $S_{ij,k}(t)$ as shown in FIGS. 3 to 5. Contrary to the prior art, the fact of using optimum offsets which are not required to be a whole number multiple of the sampling interval along the vertical axis, permits avoiding errors known under the term "aliasing".

In FIGS. 3 to 5, there is defined a conditional neighborhood $N_{ij,k}(r)$ of the reference local continuous seismic trace $S_{ij,k}(t)$ which is a sub-neighborhood of the initial neighborhood of the continuous local seismic traces taken for the computation of correlation and definition of the optimum offsets. The conditional neighborhood $N_{ij,k}(r)$ is selected such that, for any local continuous seismic trace $S_{pq,k}(t)$ belonging to $N_{ij,k}(r)$, the corresponding optimum offset $h_{ij,pq,k}$ is such that the correlation $R_{ij,pq,k}(h_{ij,pq,k})$ between $S_{ij,k}(t)$ and $S_{pq,k}(t)$ is greater than a predetermined threshold r comprised between 0 and 1.

As can be seen in FIG. 5, the fixing of the threshold r also permits including in a conditional neighborhood a geological discontinuity or fault, which constitutes an important advantage relative to the prior art.

The mentioned arrangements thus provide a continuous modeling permitting the practice of the invention.

Figure 6:
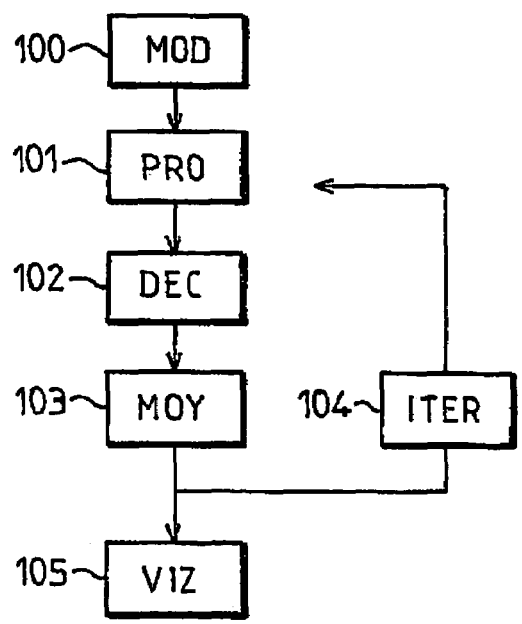
FIG. 6 represents schematically a functional organigram of a process according to the invention.

With reference to FIG. 6, a process for smoothing or cleaning a subsurface in a geological structure represented by seismic measurements, comprises a first step 100 of digital modeling, as described with reference to FIGS. 1 to 5, to define the continuous local seismic traces of a multi-dimensional seismic matrix, calculating the optimum offsets of adjacent continuous local seismic traces and defining the conditional neighborhoods of the reference central continuous local seismic traces.

After this first step 100 of digital modeling, a step 101 permits selecting the property to be smoothed on a conditional neighborhood. This property to be smoothed on a conditional neighborhood can consist of any multi-dimensional function of the surface to be analyzed.

In particular, the property to be smoothed can simply consist in the amplitude of the seismic signal reflected by the horizons of the subsurface in the direction of the measuring geophones.

In step 102, the properties of the conditional neighborhood are replaced by the properties offset by the value of the optimum offset $h_{ij,pq,k}$, so as to constitute a set of properties relative to the same horizon.

Thus, in the case of a reference central continuous seismic local trace $S_{ij,k}(t)$, all the values of $S_{pq,k}(t)$ of the conditional neighborhood are replaced by the values $S_{pq,k}(t+h_{ij,pq,k})$.

There is then carried out in step 103 an averaging of the offset values $S_{pq,k}(t+h_{ij,pq,k})$ established in step 102 and there is selected as the value of the property at the point of spatial coordinates i,j, and of the temporal depth coordinate $t=t_k=k$, the average thus calculated.

The invention is applicable to several modifications for establishing averages: one could for example use a weighted or non-weighted average; or, alternatively, one could also use an arithmetic average, a geometric average, a harmonic average, weighted or un-weighted.

In the case of a weighted average, there could desirably be used as the weighting factor the maximum value of the correlation function $R_{ij,pq,k}(h_{ij,pq,k})$ by thus reflecting the degree of confidence that can be given to each optimum offset corresponding at a maximum to a correlation function.

The smoothing or filtering process of a property according to the present invention thus permits improving the contrast and the precision of the subsurface properties in a multi-dimensional seismic matrix.

If necessary, so as to improve smoothing, the set of the processes described by the present invention can be repeated on the smoothing obtained during a preceding iteration. Step 104 constitutes an iterative step in which the operator can define the number of iterations suitable for the resolution of his problem.

The invention is preferably practiced on a device comprising means to accomplish successively the steps of the process described with reference to FIG. 6.

In particular, this device comprises means for visualizing seismic parameters or properties obtained in step 105 and means for program memorizing and intermediate computations.

Preferably, this device is a programmable device controlled by a computer software package, produced to practice a process according to the invention.

The invention described with reference to various particular objects is not in any way thereby limited but on the contrary covers any modification of form or any modification of embodiment within the spirit and scope of the invention, the essential point being to use values of properties that have failed relative to the predetermined optimum offsets as values corresponding to the maximization of the correlation functions of local seismic traces that are continuous or even discrete.

The invention claimed is:

1. Process for smoothing a subsurface property in a geological structure represented by seismic measurements, in which there is constructed a continuous function $S_{ij,k}(t)$ by interpolation or approximation of the discrete seismic traces of a multi-dimensional seismic matrix, said function $S_{ij,k}(t)$ being designed as a "continuous local seismic trace", comprising the following steps:

a). using as optimum offset of two adjacent continuous local seismic traces $S_{ij,k}(t)$ and $S_{pq,k}(t)$, the value of offset rendering maximum their correlation function, this optimum offset not necessarily being a whole number multiple of the vertical sampling interval;

b). using as conditional neighborhood of a central continuous local seismic trace $S_{ij,k}(t)$ the sub-neighborhood consisting of adjacent traces $S_{pq,k}(t)$ corresponding to optimum offsets associated with correlations $R_{ij,pq,k}(h)$ greater than a predetermined threshold comprised between 0 and 1;

c). selecting a property of a subsurface to be smoothed in the conditional neighborhood of a point (i, j, k) of a reference "central" continuous local seismic trace;

d). offsetting the subsurface properties of the conditional neighborhood by translating the current variable of the value of optimum offset $h_{ij,pq,k}$;

e). taking as the smoothed value of the point (i, j, k) an average of the subsurface properties offset in step d).

2. Process according to claim 1, in which the average of the surface properties of step e) is a weighted average, for example by the value of maximum correlation corresponding to the optimum offset.

3. Process according to claim 1, in which the average of the subsurface properties of step e) is selected from the following set: arithmetic average, geometric average, harmonic average, weighted or not.

4. Process according to claim 1, in which there is selected as the subsurface property to be smoothed, the amplitude reflected and detected by geophones.

5. Process according to claim 1, in which the process of smoothing is repeated by applying to the result a prior smoothing.

6. Process according to claim 1, in which a multi-dimensional matrix of smoothed property is visualized on a visualization screen.

7. Device for the practice of the process according to claim 1, comprising means to utilize as optimum offset of two adjacent continuous local seismic traces, the value $h_{ij,pq,k}$ of offset rendering maximal their correlation function, means to offset the subsurface properties of the conditional neighborhood by translating the current variable of the value of optimum offset $h_{ij,pq,k}$, means to select a property of the subsurface to be smoothed in the conditional neighborhood of a point (i, j, k) of a reference central continuous local seismic trace, means to offset the subsurface properties of the conditional neighborhood by translating the current variable of the value of optimum offset $h_{ij,pq,k}$, and means to take as the smoothed value of the point (i, j, k) an average of the subsurface properties offset in step d).

8. Device comprising means for memorizing and means for visualizing seismic parameters determined with the help of the process according to claim 1.

9. A computer readable medium tangibly embodying a computer program comprising elements of program code executable by the computer to control the computer to execute the steps of the process according to claim 1.

10. A computer readable medium tangibly embodying a computer program comprising elements of program code executable by the computer to control the computer to execute the steps of the process according to claim 6.

11. Process according to claim 2, in which the average of the subsurface properties of step e) is selected from the following set: arithmetic average, geometric average, harmonic average, weighted or not.

12. Process according to claim 2, in which the process of smoothing is repeated by applying to the result a prior smoothing.

13. Process according to claim 3, in which the process of smoothing is repeated by applying to the result a prior smoothing.

14. Process according to claim 4, in which the process of smoothing is repeated by applying to the result a prior smoothing.

15. Process according to claim 5, in which a multidimensional matrix of smoothed property is visualized on a visualization screen.

16. Device for the practice of the process according to claim 2, comprising means to utilize as optimum offset of two adjacent continuous local seismic traces, the value $h_{ij,pq,k}$ of offset rendering maximal their correlation function, means to offset the subsurface properties of the conditional neighborhood by translating the current variable of the value of optimum offset $h_{ij,pq,k}$, means to select a property of the subsurface to be smoothed in the conditional neighborhood of a point (i, j, k) of a reference central continuous local seismic trace, means to offset the subsurface properties of the conditional neighborhood by translating the current variable of the value of optimum offset $h_{ij,pq,k}$, and means to take as the smoothed value of the point (i, j, k) an average of the subsurface properties offset in step d).

17. Device for the practice of the process according to claim 3, comprising means to utilize as optimum offset of two adjacent continuous local seismic traces, the value $h_{ij,pq,k}$ of offset rendering maximal their correlation function, means to offset the subsurface properties of the conditional neighborhood by translating the current variable of the value of optimum offset $h_{ij,pq,k}$, means to select a property of the subsurface to be smoothed in the conditional neighborhood of a point (i, j, k) of a reference central continuous local seismic trace, means to offset the subsurface properties of the conditional neighborhood by translating the current variable of the value of optimum offset $h_{ij,pq,k}$, and means to take as the smoothed value of the point (i, j, k) an average of the subsurface properties offset in step d).

18. Device for the practice of the process according to claim 4, comprising means to utilize as optimum offset of two adjacent continuous local seismic traces, the value $h_{ij,pq,k}$ of offset rendering maximal their correlation function, means to offset the subsurface properties of the conditional neighborhood by translating the current variable of the value of optimum offset $h_{ij,pq,k}$, means to select a property of the subsurface to be smoothed in the conditional neighborhood of a point (i, j, k) of a reference central continuous local seismic trace, means to offset the subsurface properties of the conditional neighborhood by translating the current variable of the value of optimum offset $h_{ij,pq,k}$, and means to take as the smoothed value of the point (i, j, k) an average of the subsurface properties offset in step d).

* * * * *